(No Model.)
J. H. GORDON.
IRRIGATION SHOVEL.
No. 557,380. Patented Mar. 31, 1896.
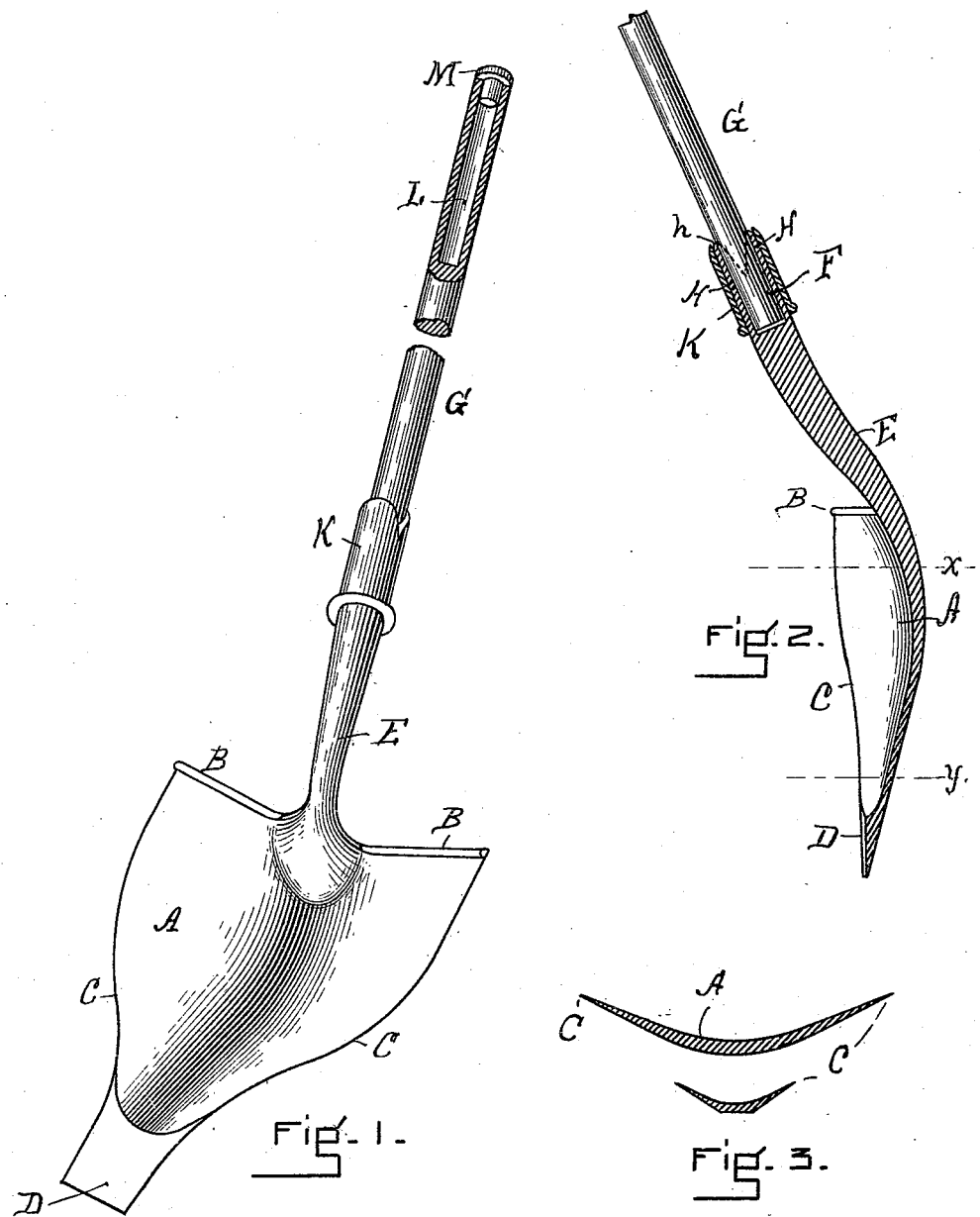

UNITED STATES PATENT OFFICE.

JOHN H. GORDON, OF SOUTH BEND, WYOMING, ASSIGNOR OF PART INTEREST TO THOMAS GORDON, OF SAME PLACE, AND HENRY MUNROE ROGERS, OF BOSTON, MASSACHUSETTS.

IRRIGATION-SHOVEL.

SPECIFICATION forming part of Letters Patent No. 557,380, dated March 31, 1896.

Application filed February 20, 1894. Serial No. 500,904. (No model.)

*To all whom it may concern:*

Be it known that I, JOHN H. GORDON, of South Bend, in the county of Laramie and State of Wyoming, have invented certain new and useful Improvements in Irrigation-Shovels, of which the following, taken in connection with the accompanying drawings, is a specification.

It is well known to those employed in conducting water from large irrigation-ditches that digging and shoveling are both absolutely necessary to make the ditches which conduct the water over the land to be irrigated, and as a spade is never employed for shoveling or a shovel for digging, the operator is compelled to carry the two implements with him in order that the intended work may be accomplished.

My invention undertakes, in the first place, to combine in one implement the blade characteristics of both the spade and the shovel and to overcome the difficulties which present themselves by the use of either separately.

It is also well known to all engaged in the work of irrigation, or in kindred work, that the handle of a spade or shovel is most liable to break at the junction of the shaft of the blade with the handle, and that it is practically impossible to insert a new handle into a shovel or spade with any of the appliances that are ready at hand where irrigation is carried on, especially in the field, where the necessary tools cannot be procured. I have therefore undertaken, as a second part of my invention, to overcome this difficulty by an improvement in the means of attachment of the handle to the shaft of the spade or shovel whereby the weakness and difficulty referred to are entirely obviated.

It is also well known that shovels and spades in actual use speedily lose their cutting and shoveling capacity from the fact that the edges become turned or dull by coming in contact with rock, gravel, and other hard substances, which involves a great waste of power and time to accomplish the work. To remedy this, I have undertaken, by an addition or device on the end of the handle, to provide for the necessary files being carried so that the shovel or spade can be edged up and put in proper condition in a very few minutes.

My invention consists in the novel construction and combination of the several parts in a shovel, as is hereinafter more fully set forth, and pointed out in the claim.

In the drawings, Figure 1 is a perspective view of my improved shovel with the handle broken away. Fig. 2 is a longitudinal central section thereof, and Fig. 3 transverse sections of the blade on the lines $x$ and $y$, Fig. 2.

The blade or body A of the tool is approximately triangular in its outlines, and is decidedly concaved or scoop-shaped, so as to hold a quantity of earth or other matter. The upper edge is raised or reinforced by ribs B for the foot of the workman to press upon. From the outer ends of these ribs the sharpened edges C of the blade converge in a reversed curve to the tip D, which is shaped much like a plow-point, having nearly parallel sides and a square end, sharp, wedge-shaped, or like a cold-chisel, so that it is strong and adapted to penetrate between rocks or to cut channels in clay or the like.

The upper surface of the tip D for nearly two inches of its length is flat and in the same plane with the blade edges C and the extremities of the ribs B, while its under surface is a direct continuation of the bottom of the blade at its center line, the blade being thickened at this line for strength and tapering toward each edge C. The concavity of the blade begins abruptly at the inner end of the tip D and curves thence rearwardly and laterally to conform generally to the bottom surface.

E is the stem or shank of the tool, formed in one piece with the body A of cast-steel. The shank may be hollow throughout. It gradually enlarges and at its upper end has a socket F to receive the end of the wooden handle G. The walls of this socket are slotted at each side, so as to form jaws or lips H, which may be compressed to seize the handle end when inserted. To hold it more firmly, I provide the extremities of the lips with ridges $h$, and I furnish a sliding clamp or coupling K, which may be driven up from the smaller to the larger part of the shank, so as to forcibly compress the lips or socket-walls and thus hold the handle with great firmness. The coupling is preferably formed like the socket F, with slotted sides or openings converging about as shown. This coupling may be driven on over the jaws H by springing them together before applying the handle.

The wooden handle will be of the required length, and is formed with a file-socket L in its outer end, closed by a cap M, so that one or more files for dressing the blade-edges may be at hand when required in the field.

It will be seen that my implement is peculiarly adapted to the various requirements of irrigation farmers, since its shape enables them to do a variety of work with one tool, as has been explained. The protruding tip D serves in many cases the functions of a pick or crowbar in digging a narrow deep hole or trench, as when a drain-pipe is to be laid in the bottom of a ditch. From this point the edges of the blade or body A curve outwardly and upwardly, and being quite sharp and readily made more so they follow the tip through strong sod and into any soil with comparative ease. The scoop shape of the blade enables it to remove large quantities of earth at every stroke.

I claim as my invention—

The shovel-blade substantially as herein described consisting of the concave body or blade having its side edges converging toward and merging in those of a chisel-like point whose upper face is in a common plane with the side edges of the body and whose under face is coincident with that of the body all substantially as and for the purposes set forth.

In testimony whereof I have signed my name to this specification, in the presence of two subscribing witnesses, on this 6th day of February, A. D. 1894.

JOHN H. GORDON.

Witnesses:
A. H. SPENCER,
ALBERT POOR.